M. E. HOLMES.
METHOD OF MAKING BATTERY DEPOLARIZERS.
APPLICATION FILED AUG. 25, 1913.
1,221,991.
Patented Apr. 10, 1917.
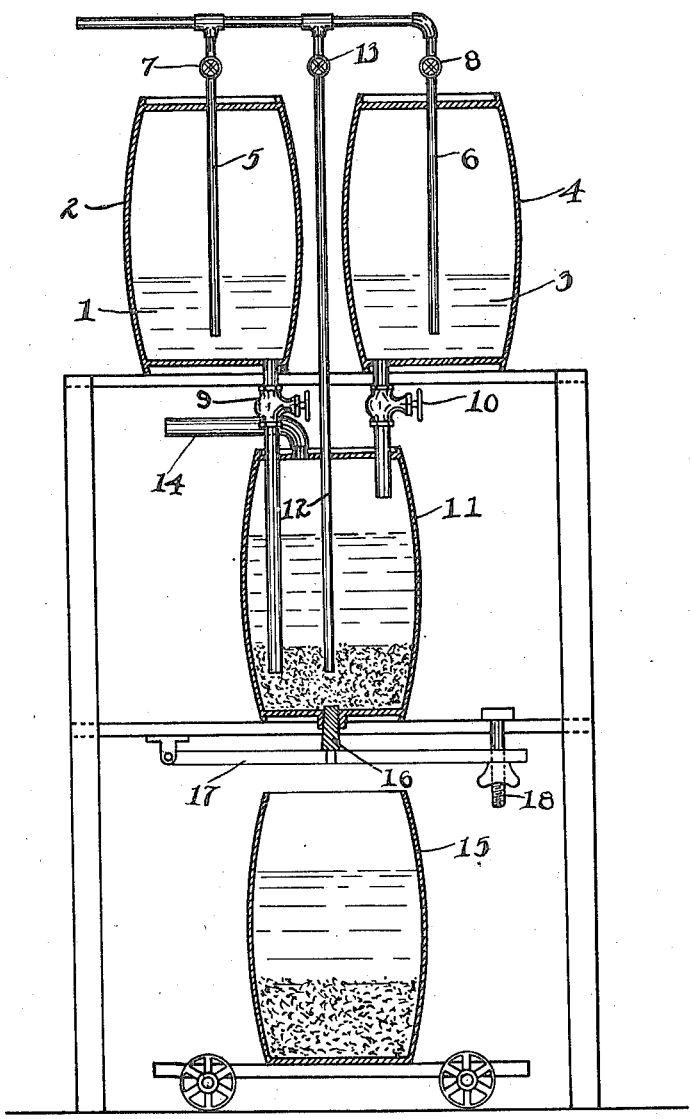
WITNESSES:
D. Brewer
H. G. Grover
INVENTOR
MAJOR E. HOLMES
BY Ira J. Adams
ATTORNEY

UNITED STATES PATENT OFFICE.

MAJOR E. HOLMES, OF LAKEWOOD, OHIO, ASSIGNOR TO NATIONAL CARBON COMPANY, OF CLEVELAND, OHIO, A CORPORATION OF NEW JERSEY.

METHOD OF MAKING BATTERY-DEPOLARIZERS.

1,221,991.      Specification of Letters Patent.      Patented Apr. 10, 1917.

Application filed August 25, 1913. Serial No. 786,366.

*To all whom it may concern:*

Be it known that I, MAJOR E. HOLMES, a citizen of the United States, residing at Lakewood, in the county of Cuyahoga and State of Ohio, have invented a certain new and useful Improvement in Methods of Making Battery-Depolarizers, of which the following is a full, clear, and exact description.

This invention relates to depolarizers for use especially in dry batteries, and more particularly in that type of dry batteries, known as "midget cells." Since cells of this type are subjected to very severe current drains, the depolarizer must be very efficient. For this reason, the ordinary pyrolusite depolarizer is not satisfactory.

In my co-pending application filed November 21st, 1912, Serial No. 732,615, I have disclosed and claimed a process of making manganese peroxid by chemically precipitating the same and subjecting it to further treatment to change the character of the precipitate. I have found by modifying the process there described and claimed, I obtain an improved form of battery mix. In the usual type of dry battery mix pyrolusite or other form of oxidizing agent has been mixed with pulverized graphite, or carbon, before being packed in the dry cell around the carbon electrode. Since such a mixture is obtained by purely mechanical means, it is difficult to obtain a uniform distribution of the depolarizer among the graphite particles. To secure best results, with such a mechanical mixture, a manganese peroxid particle should lie adjacent each particle of graphite, or carbon in the mix. The current passing from the electrolyte to the particles of graphite, or carbon, liberates hydrogen and if a particle of the depolarizer were located at each place where the current enters the carbon particles, it would be in position to give up its oxygen to combine with the liberated hydrogen and prevent the polarization of the battery.

If the manganese peroxid is precipitated on each of the graphite or carbon particles or in the pores of the same, the depolarizer is even better situated to give up its oxygen since it exists at the exact surface where the hydrogen ions are liberated.

The method by which the depolarizer is precipitated around and in the graphite particles may vary but I will describe the process which I have found to be efficient.

The single figure of the drawing illustrates a simple apparatus for the carrying out of the process and for producing the depolarizer to be used in dry cells.

I have found that if manganese peroxid is precipitated from hot solutions, it is better fitted for a battery depolarizer than if precipitated from cold solutions. In the apparatus disclosed, means is therefore used to keep the solutions in a heated state. A solution of manganese chlorid 1 in the barrel 2, and a solution of potassium permanganate 3 in the barrel 4 are maintained in a heated condition by the steam issuing through the pipes 5 and 6, the rate of flow of the steam being controlled by the valves 7 and 8. Beneath the barrels 2 and 4 is a barrel 11 containing pulverized graphite, which may be mixed with a liquid such as water or it may be first placed in the barrel in a dry condition and later mixed with potassium permanganate solution from barrel 4.

When the potassium permanganate solution 3 is heated to the correct temperature which is in the neighborhood of the boiling point of water, valve 10 is opened and the solution is admitted to the barrel 11. Steam is then admitted through pipe 12 to keep the permanganate and suspended graphite in a heated condition, and also to keep the graphite thoroughly mixed in the solution. When the permanganate has had sufficient time to thoroughly soak into the graphite particles, valve 9 is opened and manganese chlorid is admitted to the mixture. This immediately causes a reaction in accordance with the following equation:

$$3MnCl_2 + K_2Mn_2O_8 + (2+x)H_2O = 5MnO_2 \cdot xH_2O + 2KCl + 4HCl.$$

The manganese peroxid in the hydrated form is precipitated out on the surface of each graphite particle and in the pores of the same. Some of the manganese peroxid is of course, precipitated in the solution direct, falling down as particles separate from the graphite. However, sufficient solution is used to insure that the graphite particles are thoroughly coated and permeated with the precipitate.

When the precipitation is complete, sufficient time is allowed to permit the graphite and manganese peroxid to settle to the bottom as shown in the figure, and then the plug 16 is removed from the bottom of the barrel 11 to discharge the sediment into barrel 15. As a convenient means of controlling the plug 16, I have shown it fastened to a pivoted lever 17 detachably secured at one end by the nut and bolt 18.

The precipitate in barrel 15 is removed for further treatment such as decantation and washing to remove impurities while the operation is repeated in the upper portion of the apparatus. The material remaining after washing and decantation consists of graphite, or carbon, coated and permeated with hydrated manganese peroxid which can be used immediately in dry cells as soon as dried out sufficiently if desired. The hydrated form of manganese peroxid has some advantages as a depolarizer, one of which is a high electromotive force. It has disadvantages, however, as a depolarizer, chief among which is its propensity to react with the zinc chlorid of the electrolyte to form hydrochloric acid. The liberated hydrochloric acid of course attacks the zinc electrode of the dry cell, regardless of whether the cell is in storage or in use. A dry cell made with the hydrated form of manganese peroxid, therefore, has what is known as short "shelf life" as is stated in my prior application above referred to. A much better depolarizer is produced if the manganese peroxid is transferred over to the dehydrated form. The best way to bring about this change is to dry the precipitate to approximately 120 degrees C. to remove the surplus water in the mixture, and then grind it to a powdery condition. The powder which consists of graphite and manganese peroxid is then calcined at about 300 degrees C. which drives off the water of hydration, and leaves the $MnO_2$ in a dehydrated and substantially pure form.

The grinding process may loosen some of the manganese peroxid from the graphite particles to which it had adhered, but a greater part of it still adheres thereto.

The mixture of depolarizer and graphite is used in the usual way around a carbon electrode in a zinc container, a sufficient amount of the usual electrolyte solution, of course, being used.

I have found that a dry cell containing a depolarizing mixture of this nature has great recuperative powers, and its voltage, therefore, holds up better under severe drainage of current from it. The manganese peroxid is perfectly mixed with the graphite particles and is in correct position for combining with the hydrogen formed by the electrolytic action of the battery. The uniformity of such a mix allows the oxygen required for depolarizing purposes to be given off at every part of the battery mix, assuring complete depolarization. The preceding method of preparing the depolarizer could readily be carried on continuously, but I have described it as an intermittent process to simplify the explanation. It is, of course obvious that the manganese chlorid and potassium permanganate can be admitted to the graphite solution in the barrel 11 simultaneously.

My method of preparing a battery mix consisting of a precipitated depolarizer on and in conducting particles is not limited to the chemicals given nor is it limited to the manganese precipitate or to graphite. While manganese peroxid is generally accepted as the best depolarizer to use with dry cells at the present time, it is, of course, permissible to use my method with other forms of depolarizers.

As an illustration of other combinations of chemicals than that given for the precipitation above, I may mention potassium permanganate and hydrochloric acid; manganese chlorid and either ammonium persulfate or sodium hypochlorite (alkaline solution). To precipitate other depolarizers on the conducting material, the following may be given by way of example: sodium hydroxid and mercuric chlorid to precipitate mercuric oxid.

I have also deposited the depolarizer on graphite by electrolytic means and the invention is, therefore, not to be restricted to the chemical means of carrying out the method, but is to be interpreted broadly.

The apparatus shown is only given by way of example and other forms may be used when desired.

No claim is made herein to a dry cell containing the improved mix, as the same is claimed in my copending case filed August 25, 1913, Serial No. 786,365.

Having described my invention, what I claim is:

1. The process of preparing an oxid depolarizer, which consists in agitating pulverized carbon in an oxidizing solution and adding a metallic salt capable of reacting with said solution to precipitate an oxid in intimate contact with the carbon particles.

2. A process of preparing a battery depolarizer which consists in soaking pulverized conducting material in a solution of potassium permanganate, adding a solution of a manganese salt to precipitate manganese peroxid in intimate contact with the particles of said material, admitting steam prior to and during the precipitation, and removing the precipitate from the solution.

3. The process of preparing a battery depolarizer which consists in mixing together hot solutions of manganous chlorid and potassium permanganate with pulverized graphite whereby manganese peroxid is precipitated in intimate contact with the particles of the graphite, admitting steam prior to and during the precipitation, removing the precipitate from the mother liquor and calcining it to drive off the water of hydration.

In testimony whereof, I hereunto affix my signature.

MAJOR E. HOLMES.

Witnesses:
 IRA J. ADAMS,
 JAMES J. STAHL.